United States Patent

[11] 3,620,668

[72] Inventor Paul R. Cutter
 Golden, Colo.
[21] Appl. No. 729,909
[22] Filed May 17, 1968
[45] Patented Nov. 16, 1971
[73] Assignee United States Steel Corporation
 Pittsburgh, Pa.

[54] AMMONIATED WET PROCESS PHOSPHORIC
 ACID SUSPENSION BASE
 7 Claims, No Drawings
[52] U.S. Cl. .................................................. 23/107,
 71/33
[51] Int. Cl. ...................................................... C01b 25/28
[50] Field of Search ........................................ 23/107;
 71/33

[56] References Cited
UNITED STATES PATENTS

| | | | |
|---|---|---|---|
| 3,015,552 | 1/1962 | Striplin et al. ................. | 23/107 X |
| 3,057,711 | 10/1962 | Reusser et al. ................. | 23/107 X |
| 3,113,858 | 12/1963 | Slack et al. .................... | 23/107 X |
| 3,199,973 | 8/1965 | Moore ........................... | 23/107 X |
| 3,077,381 | 2/1963 | Bergsteinson et al. ......... | 23/165 D |

*Primary Examiner*—Oscar R. Vertiz
*Assistant Examiner*—Charles B. Rodman
*Attorney*—Gene Harsh ABSTRACT: An ammoniated wet process phosphoric acid suspension base is prepared by mixing wet process orthophosphoric acid and superphosphoric acid to provide a mixture containing about 10–20 percent polyphosphoric acid, and ammoniating the mixture to provide an $N/P_2O_5$ ratio of about 0.32–0.35 and thereafter cooling the material and seeding with finely divided diammonium phosphate crystals. Attapulgite clay may be added just before the seeding step.

AMMONIATED WET PROCESS PHOSPHORIC ACID SUSPENSION BASE

BACKGROUND AND SUMMARY

Wet process phosphoric acid contains a substantial percentage (usually 1–5 percent) of metal (aluminum and iron) impurities which form metal phosphates during the preparation of a fertilizer and, since such phosphates are valuable, it is important to keep them in suspension during storage under varying weather conditions including freezing weather. A suspension base is prepared by ammoniating such wet process phosphoric acid, and it is important to have the ammoniated suspension base stable after long storage periods under weather conditions mentioned above so that the base can be employed at cold mix stations for forming different formulas by the addition of potassium chloride, urea, ammonium nitrate, etc.

It has been known that superphosphoric acid, by reason of its high content of polyphosphoric acid, is effective in sequestering metal impurities, but superphosphoric acid is difficult to manufacture and rather corrosive, and its cost per ton makes it unattractive economically in larger quantities than necessary as a source of the $P_2O_5$. When mixtures of superphosphoric acid and orthophosphoric acid are employed, it has been found that large monoammonium phosphate crystals grow very rapidly and are so troublesome that many manufacturers resort to the use of superphosphoric acid alone or a mixture in which the superphosphoric acid is by far the major portion of the mixture.

I have discovered that a mixture of wet process orthophosphoric acid and superphosphoric acid can be employed in which the polyphosphoric acid content is as little as 10–20 percent of the total $P_2O_5$ content, so that after ammoniation the $N/P_2O_5$ ratio is in the range of 0.32–0.35 so that the diammonium phosphate crystals dominate in the solid phase, leaving the monoammonium phosphate recessive, and by cooling the ammoniated material and seeding it with finely divided diammonium phosphate crystals, a suspension base is obtained which is substantially free of monoammonium phosphate crystals and which effectively suspends the metal phosphate during adverse temperature conditions. While not essential, I prefer to introduce a small amount of binder clay (preferably about 3 percent), such as, for example, attapulgite clay, into the ammoniated wet process phosphoric acid material after it has been cooled and prior to the seeding with diammonium phosphate crystals.

DETAILED DESCRIPTION

In preparing the ammoniated wet process phosphoric acid suspension base, I mix a larger proportion of wet process orthophosphoric acid with a smaller proportion of superphosphoric acid to form a mixture in which the polyphosphoric acid content is from 8–80 percent by weight (preferably 10–20 percent by weight). Since the upper limit of polyphosphoric acid is not critical, one may use any desired amount of polyacid but, because of its expense, I wish to reduce the amount of polyacid employed and I find that generally about 10–20 percent of polyphosphoric acid is adequate.

By way of example, 80 percent by weight of wet process orthophosphoric acid may be mixed with about 20 percent by weight of superphosphoric acid which contains about 50 percent polyphosphoric acids. Since the content of polyacids varies in the superphosphoric acid, the matter of mixing the acids to give the desired content of polyacid in the final mixture is a relatively simple proportioning procedure, and it is further a simple matter to ammoniate the mixture to bring the $N/P_2O_5$ ratio into the range of 0.32–0.35.

The ammoniation procedure is not critical but may be the conventional process in which ammonia and the phosphoric acid are heated and the temperatures then raised by the exothermic reaction. Usually the temperatures are in the range of about 150–250° F. The desired end product is an ammonium phosphate having the $N/P_2O_5$ ratio of 0.32–0.35.

The ammoniated material is cooled below 200° F., and preferably to about 100° F., and finely divided diammonium phosphate crystals are introduced into the mass. Usually about 0.1–2 percent of crystals by weight are added, and I prefer to use crystals which are extremely fine, passing a 325-mesh screen.

The resulting product is substantially free of the large monoammonium phosphate crystals and the metal impurities are effectively suspended in the base for substantial periods of time under cold weather conditions.

I have also found that it is advantageous to add a clay, such as attapulgite clay, in the suspension base after it is cooled below 200° F. and before the diammonium phosphate crystals are added. This also aids in stopping the growth of the monoammonium phosphate crystals, and aids also in the suspension of the metal phosphates. The mass should be strongly agitated during the addition of the clay.

In the foregoing operation, the high $N/P_2O_5$ weight ratio gives maximum solubility and minimum crystal content, while at the same time this ratio encourages growth of diammonium phosphate over monoammonium phosphate. Cooperating with the high $N/P_2O_5$ ratio is the seeding with diammonium phosphate in encouraging the growth of diammonium phosphate while rendering monoammonium phosphate recessive. The process enables one to obtain a stable suspension with as low as 10–20 percent polyphosphoric acid in the suspension.

Specific examples which are illustrative of the invention may be set out as follows:

EXAMPLE I

A 14—14—14 suspension containing 14 percent by weight of each of N, $P_2O_5$, and $K_2O$ was prepared as follows. To begin with, a certain amount of water is placed in a container equipped with an agitator and an ammonia sparger. Orthophosphoric acid derived from wet process methods and superphosphoric acid containing about 50 percent polyphosphoric acids are added to the water simultaneously with ammonia. About 75 percent of the $P_2O_5$ is added to the suspension in the form of wet process, 54 percent $P_2O_5$ acid and 25 percent from so-called superacid containing about 50 percent polyphosphates. Enough ammonia is added to the agitated container to maintain a pH of about 6.3; the reaction is continued until a specific gravity of about 1.40 is reached. At this point, a suspension base material is obtained having a nitrogen to $P_2O_5$ composition ranging between 11–33–0 and 12–36–0, or a $N/P_2O_5$ weight ratio of 0.333. The suspension base is first cooled to about 170° F. where 3 percent attapulgite clay is dusted into the suspension base while undergoing severe agitation. The base is then cooled to below 100° F. and 0.05 to 1 percent minus 325-mesh diammonium phosphate crystals are added to seed out a high number of uniformly sized crystals.

At this point, we have prepared what is called a suspension base which can be shipped by railroad car or tank truck to various so-called cold mix stations for completing the formula and distribution. The optimum suspension base as prepared above, with the proper ratio described and total concentration not exceeding 12–36–0, can be stored for a considerable length of time and even under temperatures down to about 12° F. without any noticeable damage. To further prepare the 14—14—14 formula, or finished grade, enough of the suspension base is added to a cold mix tank to deliver 280 pounds of $P_2O_5$ by means of the suspension base which contains 36 percent $P_2O_5$, or 780 pounds of the base to make up one ton of product. The 780 pounds of base which contains 12 percent nitrogen means that 93.6 pounds of nitrogen have also been added to the cold mix formula. 186.4 pounds of nitrogen must still be needed to obtain the 14 percent N in the formula. For the remainder of the nitrogen, the normal procedure is to use a highly concentrated solution containing urea and ammonium nitrate to make up the difference. If such a solution contains 32 percent nitrogen, then 585 pounds of the nitrogen solution would then be added to the mix tank. To place 280 pounds of $K_2O$ into the formula, 448 pounds of potassium chloride (in the crystal form) will then be needed. I have now added 1,813 pounds to 1 ton of final product. Since the clay concentration has been reduced from 3 percent to about 1.2 percent, it usually is desireable to add about 0.5–1 percent clay at this point or about 10–20 pounds of attapulgite clay. I now have room for about 165 pounds of minor nutrients and water as the case may demand. In the preparation of the final products from the optimum set of conditions previously outlined, the 14—14—14 represented a maximum total concentration of about 42. A final formula containing a higher percentage of active ingredients than 42 would probably be too thick for most applications and should best not be considered.

Other formulas which were prepared at the mix stations are: 8—16—16, 18—6—18, 20—10—10, 13—13—13, 7—14—21, 6—18—18, 5—16—24, 3—10—27, etc.

EXAMPLE II

Suspensions were prepared as described in example I with the $N/P_2O_5$ ratio above 0.32 percent, clay being omitted and the material seeded with finely divided diammonium phosphate crystals, as shown in the following table. The same were stored under Florida winter storage conditions for 6 months and found to be satisfactory as indicated in the following table.

TABLE I

| Product | Comparison dates | pH | Sp. gr. | Percent N | Percent $P_2O_5$ | | | $N+P_2O_5$ | $N/P_2O_5$ | Conditions,[1] 6 months |
| --- | --- | --- | --- | --- | --- | --- | --- | --- | --- | --- |
| | | | | | Total | Ortho | Poly | | | |
| 3-PYRO-A | 8/19/66 | 6.0 | 1.420 | 11.65 | 35.04 | 33.75 | 3.7 | 46.69 | 0.332 | Satisfactory. |
| 3% pyrophosphate | 2/14/67 | | | 11.49 | 34.60 | 32.96 | 4.8 | 46.09 | 0.332 | |
| 4-PYRO-A | 8/20/66 | 6.0 | 1.410 | 11.53 | 35.88 | 33.00 | 9.0 | 47.58 | 0.321 | Satisfactory. |
| 4% pyrophosphate | 2/14/67 | | | 11.43 | 35.69 | 32.83 | 8.01 | 47.12 | 0.320 | |
| 5-PYRO-A | 8/22/66 | 6.0 | 1.420 | 11.86 | 36.91 | 34.73 | 6.0 | 48.77 | 0.321 | Satisfactory. |
| 5% pyrophosphate | 2/14/67 | | | 12.07 | 36.68 | 34.76 | 5.24 | 48.75 | 0.329 | |

[1] Heavy crystal crust on all samples.

EXAMPLE III

The process was carried out as described in example II except that 2.3 percent of clay was added. The temperature was lowered to below 200° F. and the clay added at about 170° F. The clay was not only useful in suspending the crystals but also was useful in preventing the growth of monoammonium phosphate crystals during the cooling of the mass down to 100° F. at which time the finely divided diammonium phosphate crystal seeds were added.

EXAMPLE IV

The process was carried out as described in example I except that after the ammoniated solution was lowered to about 100° F., 500 p.p.m. of -325-mesh diammonium phosphate crystals were added. After the addition of 2 percent clay, the temperature was lowered with minimum agitation and no air entrainment to about 100° F. and then the diammonium phosphate crystals were added with air entrainment to induce crystallization.

While in the foregoing specification, I have set out specific examples in considerable detail for the purpose of illustrating embodiments of the invention, it will be understood that such details may be varied widely by those skilled in the art without departing from the spirit of my invention.

I claim:

1. A process for the preparation of stabilized ammoniated wet process phosphoric acid suspension bases comprising the following steps:
    1. adding from about 8 to about 80 weight percent superphosphoric acid to wet process orthophosphoric acid;
    2. ammoniating the phosphoric acid mixture until the $N/P_2O_5$ ratio is from about 0.32 to about 0.35;
    3. cooling the ammoniated mixture to below 200° F.;
    4. seeding the ammoniated mixture with an effective amount of finely divided diammonium phosphate crystals.

2. The process of claim 1 wherein the ammoniated mixture is seeded with from about 0.1 to about 2 weight percent of finely divided diammonium phosphate crystals.

3. The process of claim 1 wherein the ammoniated mixture is seeded with from about 0.1 to about 2 weight percent of diammonium phosphate crystals of 325 mesh size or smaller.

4. The process of claim 1 wherein from about 2 to about 3 weight percent of the total suspension base attapulgite clay is added to the ammoniated phosphoric acid after cooling and prior to seeding with finely divided diammonium phosphate crystals.

5. The process of claim 1 wherein from about 10 to about 20 weight percent superphosphoric acid is added to the wet process phosphoric acid.

6. The process of claim 1 wherein the ammoniated mixture is cooled to below 100° F. prior to seeding with diammonium phosphate crystals.

7. The product of the process of claim 1.

* * * * *